United States Patent [19]

Kunz

[11] Patent Number: 5,157,073
[45] Date of Patent: * Oct. 20, 1992

[54] IONOMERICE COATINGS NEUTRALIZED WITH ZINC CARBONATE

[75] Inventor: Barbara L. Kunz, Strongsville, Ohio

[73] Assignee: The Glidden Company, Cleveland, Ohio

[*] Notice: The portion of the term of this patent subsequent to Oct. 13, 2009 has been disclaimed.

[21] Appl. No.: 684,808

[22] Filed: Apr. 15, 1991

Related U.S. Application Data

[63] Continuation of Ser. No. 397,279, Aug. 23, 1989, Pat. No. 5,034,452.

[51] Int. Cl.$^5$ .............................................. C03L 33/06
[52] U.S. Cl. .................... 524/560; 525/330.2
[58] Field of Search .................... 524/568; 525/330.2; 427/385.5

[56] References Cited

U.S. PATENT DOCUMENTS

| | | | |
|---|---|---|---|
| 3,264,272 | 8/1966 | Rees | 525/327.8 |
| 4,189,518 | 2/1980 | Paterson | 427/385.5 |
| 4,526,910 | 7/1985 | Das et al. | 524/560 |
| 4,537,926 | 8/1985 | Kivel et al. | 524/560 |

*Primary Examiner*—Joseph L. Schofer
*Assistant Examiner*—Jeffrey T. Smith
*Attorney, Agent, or Firm*—Thomas M. Schmitz

[57] ABSTRACT

Non-aqueous ionomeric coatings useful as protective surface coatings applied to a substrate are produced by combining a carboxyl functional polymer with zinc carbonate. Upon heat curing the applied film, the zinc cation clusters with the carboxyl polymer to produce a thermoset coating film.

2 Claims, No Drawings

IONOMERICE COATINGS NEUTRALIZED WITH ZINC CARBONATE

This is a division of application Ser. No. 397,279, filed Aug. 23, 1989, now U.S. Pat. No. 5,054,452.

BACKGROUND OF THE INVENTION

This invention pertains to ionic hydrocarbon polymers, and more particularly to surface coatings (paint coatings) containing an ionic crosslinking-type polymeric binder system comprising zinc carbonate in combination with a coreactive carboxyl functional polymer.

Protective surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives. The polymeric binder functions as a dispersant for the pigments, inerts, and other additives in wet coating compositions and further functions as a binder for the pigments and inert fillers in the cured or hardened paint film. Polymeric binders can be thermoplastic or thermosetting binders based on coreactive components such as a reactive functional polymer adapted to crosslink or coreact with a crosslinking component such as melamine or isocyanate.

Conventional thermosetting polymers often require high temperatures as well as external crosslinkers. Some crosslinkers, such as melamines in conventional industrial coatings or triglycidyl isocyanurate for powder coatings, can cause toxicity problems. Also, the release of volatile by-products, such as caprolactam, from some of these materials can cause film defects, such as cratering and bubbling.

It now has been found that excellent paint coatings can be produced based on an ionomeric polymeric binder comprising a carboxylic acid functional polymer coreacted or neutralized with zinc carbonate. The ionomer or ionic polymer was found to provide interreacting polymer chains which exhibit thermosetting properties comparable to coreactive polymeric binders crosslinked by an amino crosslinker. An ionomer can be defined as a polymer composed of a polymeric backbone containing a small amount of pendant carboxylic acid groups, usually less than 15 mole percent, which are neutralized partially or completely with zinc carbonate to form an ionomer. These ionic moities and their interactions dominate the behavior of the polymer itself where it is believed that the zinc ion of zinc carbonate is exchanged for a hydrogen ion of the polymer carboxyl group. Ionic hydrocarbon polymers for elastomers or plastics are disclosed in U.S. Pat. No. 3,264,272.

In commonly assigned Ser. No. 397,28, filed Aug. 23, 1989, ionomers are disclosed based on certain organic zinc salts having a pka above about 3.0, preferably above 3.8 and active to neutralize certain carboxyl polymers including acrylic copolymers, polyester-acrylic graft polymers, polyester polymers and urethane polymers to provide an ionic thermosetting binder used in surface coatings. Similarly, commonly assigned Ser. No. 397,279, filed Aug. 23, 1989 discloses ionomeric polymers for surface coatings based on an epoxy-ester carboxyl polymer activated by said organic zinc salts as well as zinc carbonate.

In accordance with this invention, changes in the properties of polymeric binders for paint coatings can be achieved through the interaction of zinc carbonate with carboxyl functional polymers where modification of polymer properties is believed due to aggregation of ions described as ionic crosslinking. In this regard, the coreaction of two ion pairs on adjacent polymer chains results in a four-centered aggregate which behaves essentially like a crosslink. Among the dramatic effects that have been observed with paint compositions are increases in the moduli, increases in glass transition temperatures, and increases in viscosities. The formation of ionomeric clusters in protective surface coatings causes the carboxylic acid functional polymers to behave like a phase-separated block copolymer. The use of ionomers in powder coatings specifically is particularly advantageous since it allows control of the process such that the temperature during extrusion is lower than that of the volatilization temperature of the counterion (in the acid form). Thus, the ionomeric links are not formed until after processing of the powder coating, application to a substrate, melting of the powder, flow out, and leveling to form a smooth continuous film. The actual cluster formation takes place during the bake cycle which comprises temperatures higher than the temperature where the salt will lose its acidified counterion. The ionomeric formations can be observed in solvent coatings or high solids coatings as well.

The unique properties of ionomers offer an alternate curing mechanism for solvent and high solids coatings generally and powder coatings especially, with potential for lower baking temperatures, less films defects, a unique balance of physical properties, less toxic curing chemistry, thermal reversibility and lower cost. Thus, the addition of low levels of zinc carbonate to acid functional polymeric binders has been found to have dramatic effects on the physical properties of the polymeric binder. Incorporation of zinc carbonate, for instance, causes a thermoplastic acrylic to exhibit properties such as solvent resistance and hardness comparable to a cured crosslinked paint film. Viscometry has also supported the formation of ionomeric domains in carboxylic acid functional systems, but with ionic crosslinking, these properties are thermally reversible. Useful carboxyl polymers characteristically exhibit low polarity, high hydrophobicity, and low hydrogen bonding characteristics. Zinc carbonate ionomers generally resist water or humidity and produce coatings which are not water sensitive.

The use of zinc carbonate as a neutralizing salt for inducing ionomeric interaction with certain carboxyl functional polymers was surprising because of the high basicity of the carbonate species relative to organic zinc compounds. In this regard, the highly basic carbonate anion would be expected to react with the carboxyl functional polymers prematurely during processing. However, it was unexpected to discover that zinc carbonate was a suitable metal salt for use in ionomeric coatings, and especially ionomeric powder coaings. Also, the use of an organic zinc compound ordinarily requires that the organic zinc salt melt within a temperature range below typical curing temperatures. Zinc carbonate, however, begins to degrade by loss of carbon dioxide at temperatures above about 300° C. which is considerably above curing conditions encountered during the processing and heat cures of paint and protective surface coatings. Thus, the formation of highly desirable paint film integrity properties was very surprising based on using zinc carbonate as the neutralizing agent in a carboxyl functional polymeric system capable of forming ionomers. Further, it has been found that zinc carbonate provides an advantage over various organic zinc compounds where most species evolve acidic volatiles during the curing cycle which can be malodorous and cause corrosion to heat curing equipment. In contrast, zinc carbonate evolves only harmless carbon dioxide and water. When zinc carbonate is used as the neutralizing compound, ionomeric clustering is evidenced by cured film properties exhibiting increased hardness, flexibility, gloss, and solvent resistance. Differential Scanning Calorimetry (DSC) demonstrates an increase in Tg with increasing amounts of neutralizing zinc carbonate indicating that performance properties and processing can be controlled by the extent of neutralization. These and other advantages of the invention will become more apparent from the detailed description and the illustrative examples.

SUMMARY OF THE INVENTION

Briefly, the coating composition of this invention is based on a non-aqueous polymeric binder comprising a carboxylic acid functional polymer neutralized with zinc carbonate to produce an ionomer which is adapted to gel and provide crosslink-type characteristics when heat cured as paint films. Preferred coating compositions comprise powder coatings. Carboxylic acid functional polymers contain at least 2% by weight ionizable carboxylic acid monomer. Neutralization by zinc carbonate of at least 10% of the carboxylic acid groups is required to obtain the necessary ionomer formation. Suitable ionizable carboxyl functional copolymers include acrylic copolymers, polyester-acrylic graft polymers, polyester polymers and urethane polymers.

DETAILED DESCRIPTION OF THE INVENTION

The coating composition of this invention are coatings based on an ionic polymeric binder comprising a non-aqueous carboxylic acid functional polymer at least partially neutralized with zinc carbonate.

Referring first to the carboxylic acid functional polymers, useful polymers include acrylic copolymers and polyester-acrylic graft copolymers, polyester polymers, and urethane polymers. It is believed that polarity and/or the hydrogen bonding capacity of the preferred useful polymers relates to their ability to form good ionomers. Polymers with low polarity and lower hydrogen bonding tendencies are generally hydrophobic. Ionic groups generally present in a hydrophobic environment have a greater tendency to associate in clusters or multiplets, thus avoiding the unfavorable hydrophobic environment. In each class of ionomeric polymers it is expected that the more hydrophobic polymers will form considerably improved ionomers.

Useful acrylic copolymers can be produced by polymerizing monomers in bulk, in an organic solvent, or by other suitable non-aqueous polymerization techniques. The carboxylic acid functional acrylic copolymer comprises copolymerized ethylenically unsaturated monomers, including ionizable carboxyl monomers, to produce a copolymer containing reactive primary carboxylic acid groups and having a number average molecular weight between 500 and 100,000, and preferably between 1,000 and 40,000. Number average molecular weights are typically measured by GPC according to ASTM methods such as D3016-72; D3536-76; D3593-80; or D3016-78. The acrylic copolymers can be liquid at room temperature for solution or high solids coatings but are solid for powder paints. Polymers for powder coatings generally have a Tg between 20° C. and 100° C. as calculated by the Fox equation based on the weight ratio of specific monomers. The Acid No. of the carboxylic acid functional polymer is between 10 and 200 and preferably is between 30 and 90. The copolymers can be produced by bulk or solvent polymerization of ethylenically unsaturated monomers including carboxylic acid monomers, activated by peroxide or azo or other free radical initiator at polymerization temperatures typically between 40° C. to 170° and preferably between 70° C. to 150°. Typically 0.2% to 5% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred. Other initiators include azo initiators such as azobisisobutyronitrile and persulfate or ammonium persulfates.

Typical solvents useful in preparing the organic solvent-borne acrylic copolymers can include for instance, xylene, toluene, ethyl acetate, acetone, methylisobutyl ketone, methyl n-amyl ketone, methylisoamyl ketone, ethylamyl ketone, amyl acetate, methylethyl ketone, ethyl alcohol, mineral spirits, ethylene glycol monoethyl ether acetate, and other aliphatic, cycloaliphatic and aromatic hydrocarbon, esters, ethers, ketones and alcohols. After the polymerization is completed, the solvents may be stripped off to produce a solid polymer for use in a powder coating if desired.

Copolymerizable ethylenically unsaturated monomers useful in producing the carboxylic acid functional acrylic copolymer are monomers containing carbon-to-carbon, ethylenic unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3-dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates.

The carboxylic acid functional acrylic polymer comprises copolymerized monomers including at least 2% by weight ionizable carboxylic acid monomer which may include acrylic and methacrylic acids as well as olefinic unsaturated acids. Acrylic acids include acrylic and methacrylic acid, ethacrylic acid, alpha-chloracrylic acids, alpha-cyanoacrylic acid, crotonic acid, and beta-acryloxy propionic acid. Olefinic unsaturated acids include fumaric acid, maleic acid or anhydride, itaconic acid, citraconic acid, mesaconic acid, muconic acid, glutaconic acid, aconitic acid, hydrosorbic acid, sorbic acid, alpha-chlorosorbic acid, cinnamic acid, and hydromuconic acid. On a weight basis, the carboxylic acid functional polymer contains at least 2% copolymerized carboxyl functional monomers and preferably between 5% and 15% carboxylic acid monomers. The most preferred carboxylic acid monomers are acrylic acid and methacrylic acid and such acid monomers preferably comprise on a weight basis between 5% and 15% of the copolymerized monomers in the carboxyl functional polymer. Preferred carboxyl polymers comprise copolymerized monomers on a weight basis between 0% and 95% acrylic or methacrylic monomer, between 5% and 15% acrylic or methacrylic acid, with the balance being other ethylenically unsaturated monomers. Carboxylic acid functional polymers preferably are produced in bulk or in solvent, although suspension polymerization can be used for producing powder paint compositions.

A further preferred carboxyl functional polymer comprises a polyester polymer. Polyester polymers comprise the esterification products of glycols, diols, or polyols with excess equivalents of dicarboxylic acid or polycarboxylic acids. Linear aliphatic glycols are esterified with greater molar amounts of aromatic dicarboxylic acid and/or linear saturated dicarboxylic acid having between 2 and 10 linear carbon atoms such as adipic, azelaic, succinic, glutaric, pimelic, suberic or sebacic acid to produce polyesters. Additionally, larger dicarboxylic acids, such as the dimer fatty acids, dodecanedioic acid and the like can be used. Preferred and commercially available linear saturated dicarboxylic acids are adipic, azelaic, dodecanedicarboxylic acid and the dimer fatty acids. Aromatic dicarboxylic acids (anhydrides) include phthalic, isophthalic, terephthalic, and tetrahydrophthalic. Minor amounts polyfunctional acid such as trimelletic acid can be added. Suitable glycols include linear aliphatic glycols having 2 to 8 carbon atoms, such as 1,3- or 1,4-butylene glycol, 1,6-hexane diol, neopentyl glycol, propylene glycol, ethylene glycol and diethylene glycol, propylene, and dipropylene glycol, and similar linear glycols. Additionally, the larger diols such as hydrogenated bisphenol A, and the $C_{10}$ to $C_{18}$ diols are suitable. Preferred glycols are hydrophobic glycols such as neopentyl glycol and 1,6-hexane diol and hydrogenated bisphenol A. Minor amounts of polyols can be used such as glycerol, pentaerythritol, dipentaerythritol, or trimethylol ethane or propane. The molar deficiency of the glycol over the greater molar amounts of aromatic and linear saturated dicarboxylic acid is between about 1 and 50 and preferably between about 5% and 20%. Hence, the polyester contains considerable excess unreacted carboxylic groups to provide a carboxyl polyester having an Acid No. between 5 and 300 and preferably between 20 and 100. The moleoular weight of useful polyester polymers are between 500 and 50,000 and preferably between 1,000 and 10,000. Glycol can be esterified with minor amounts of up to about 20% by weight of unsaturated dicarboxylic acids (anhydrides) including maleic, fumaric or itaconic acids; or monocarboxylic acids such as acetic, benzoic, and higher chain aliphatic and aromatic acids up to about 12 carbon atoms. The polyester component can be produced by solvent or bulk polymerization although bulk polymerization is preferred. The raw materials can be charged in bulk and esterification polymerized at temperatures typically between 170° C. to 240° C. although moderately higher or lower temperatures can be utilized satisfactorily. An esterification catalyst can be used, typically at less than 1% levels based on charge, such as an organic tin compound.

A further preferred carboxyl polymer of this invention is directed to a carboxyl functional polymer comprising a polyester-acrylic graft polymer. Grafted copolymers of polyester and acrylics can be produced by free-radical polymerization of ethylenically unsaturated monomers, including acrylic and carboxyl monomers, in the presence of a preformed molten or fluid polyester at temperatures sufficient to induce addition copolymerization of the monomers along with some grafting onto the polyester backbone. Organic solvents are not required, but can be added if desired to provide desired viscosity in solvent coatings. On a weight basis, the polyester-acrylic graft polymer contains between 10% and 70%, and preferably between 10% and 40% polyester polymer component with balance being the acrylic polymer component. The polyester component of the polyester acrylic graft polymer is a moderate molecular weight polymer having a molecular weight between about 500 and 50,000 and preferably between 1,000 and 5,000 based on number average. The acrylic polymer component of the polyester-acrylic graft polymer comprises in-situ copolymerized ethylenically unsaturated monomers, including acrylic monomers and carboxyl monomers, along with other ethylenically unsaturated monomers if desired. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates. Acrylic acids include acrylic and methacrylic acid, ethacrylic acid, alpha-chloroacrylic acid, alpha-cycanoacrylic acid, crotonic acid, beta-acryloxy propionic acid, and beta-styryl acrylic acid. Other ethylenically unsaturated monomers have been previously described herein. The copolymerized monomers for the acrylic component of the polyester-acrylic graft polymer comprises copolymerized monomers, on a weight basis between 1% and 100% acrylic monomer, between 0% and 30% acrylic or methacrylic carboxylic acid monomer, with the balance being other ethylenically unsaturated monomers. Preferred acrylic components comprise on a weight basis between 20% and 90% acrylic monomer, between 5% and 15% carboxyl acid monomer, with the balance being other ethylenically unsaturated monomers. It should be noted that the carboxyl functionality can be part of the polyester polymer or part of the grafted acrylic polymer or both polymers. The Acid No. of the polyester-acrylic graft can be between 10 and 300 and preferably between about 20 and 100. The polyester-acrylic graft polymer preferably comprises by weight between 10% and 70% polyester polymer component and between 30% and 90% acrylic polymer component. The number average molecular weight of the polyester-acrylic graft polymer is between about 2,000 and 100,000 while preferred molecular weights are between 5,000 and 50,000 as measured by GPC. GPC chromatograms of the polyester and the grafted polyester-acrylic indicated that good grafting efficiency was obtained.

Grafted polyester-acrylic copolymers for powder coatings are prepared by polymerizing acrylic monomers in melted polyester to produce a product having good powder resin properties such as good tack, processability, grinding, and application properties. Solvent-borne coatings can be prepared in solvent, or subsequently dissolved in solvents. When cured, films of the grafted polyester-acrylic indicate no evidence of incompatibility, between polyester and acrylic polymer chains, but do exhibit good solvent resistance, excellent flexibility on a conical mandrel, and excellent impact resistance. An added advantage to this process is the simplicity in processing on large scale, where the polyester can be prepared in a reactor, and then acrylic monomers can be added immediately and copolymerized to form the grafted polymer. For preparation of powder paints, no solvent is required and thus stripping is not necessary. Highly desirable cured paint films were produced with good results by the ionomeric curing process of this invention which exhibited excellent flexibility along with highly desired solvent resistance, water resistance, hardness, and impact resistance.

A further preferred carboxyl polymer of this invention, a carboxyl functional polymer comprising a urethane ionomer provides an excellent ionomer polymer useful as a binder in coatings and particularly paint coatings. Urethane ionomers can be produced with terminal carboxyl groups as well as dependent carboxyl groups which can be crosslinked by zinc carbonate or zinc bicarbonate upon heating in accordance with this invention. Improved physical properties of cured paint films, particularly cured powder paint films, are readily evident. Urethane ionomers provide a special set of advantages to powder coatings: weatherability, flexibility, wide latitude in polymer structure, control in synthesis, allowing positioning of flexible units along the backbone, and position of acid groups at the end or in the middle of the urethane polymer chain. Urethane ionomeric powder coatings provide high quality coatings with a good overall balance of properties.

Carboxyl functional urethanes can be produced by coreacting diisocyanates with a diol or a polyol and a hydroxyl acid. Linear polyurethanes are obtained from difunctional reactants while branched polyurethanes are produced from the combination of difunctional and higher functional reactants. Urethanes for ionomeric crosslinking in coatings can be prepared from any of several available aromatic, aliphatic, and cycloaliphatic diisocyanates and polyisocyanates. Suitable polyisocyanates can be di- or triisocyanates such as, for example, 2,4- and 2,6-tolylene diisocyanates, phenylene diisocyanate; hexamethylene or tetramethylene diisocyanates, 1,5-naphthalene diisocyanate, ethylene or propylene diisocyanates, trimethylene or triphenyl or triphenylsulfone triisocyanate, and similar di- or triisocyanates or mixtures thereof. The polyisocyanate can be generally selected from the group of aliphatic, cyclo-aliphatic and aromatic polyisocyanates such as for example hexamethylene 1,6-diisocyanate, isophorone diisocyanate, diphenylmethane diisocyanate 2,4-tolylene diisocyanate, 2,6-tolylene diisocyanate and mixtures thereof, polymethylene polyphenyl polyisocyanate, or isocyanate functional prepolymers. Preferred diisocyanates include isophorone diisocyanate, hexamethylene diisocyanate, toluene diisocyanate and the like.

A wide variety of diols and polyols can be used to prepare urethanes with a wide range of properties. Polyethers, such as the polytetramethylene oxides can be used to impart flexibility as well as the polyethylene oxides and polypropylene oxides. Simple diols that can be used include neopentyl glycol, 1,6 hexane diol, and longer chain diols having 12, 14 and higher carbon chains. Branching can be introduced with polyols such as trimethylol propane and pentaerythritol. Hydroxyl functional polyesters and various other hydroxyl functional polymers are also suitable. Useful polyols preferably contain two, three, or four hydroxyl groups for coreaction with the free isocyanate groups. Useful polyols are: -diols such as ethylene glycol, propylene glycols, butylene glycols, neopentyl glycol, 14-cyclohexane dimethanol, hydrogenated bisphenol A, etc.; triols such as glycerol, trimethylol propane, trimethylol ethane; tetrols such as pentaerythritol; hexols such as sorbitol, dipentaerythritol, etc.; polyether polyols produced by the addition of alkylene oxides to polyols; polycaprolactone polyols produced by the addition of monomeric lactones to polyols, such as caprolactone; and hydroxyl terminated polyesters.

The polyurethane copolymer of this invention further contains a coreacted hydroxy-acid material. The hydroxy-acid contains at least one reactive hydroxy group for coreacting with the isocyanate during polymer synthesis and at least one non-reactive carboxy group which is essentially non-reactive to the isocyanate groups during the polymer synthesis. The hydroxy-acid can be represented by the general formula:

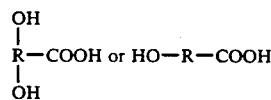

where R is alkyl of 1 to 20 carbon atoms or aromatic or alkyl-aromatic. Examples of alkyl acids are 2,2 dihydroxymethyl propionic acid, 2,2-dihydroxymethyl butyric acid, glycolic acid, and the like; other acids are glycolic acid, lactic acid, 12-hydroxy stearic acid, the product of the Diels-Alder addition of sorbic acid to di-(2-hydroxyethyl) maleate or fumarate, or low molecular weight (300 to 600) precondensates of polyols with tribasic acids such as trimelletic anhydride or Ricinoleic acid. Acid functionality can be introduced with materials like 12-hydroxystearate, dimethylolpropionic acid, and various other hydroxy acids. Monohydroxyl acids will place the acid functionality at the end of the chain, while the diol acids will randomly place the acid groups in the chain. When isocyanates are reacted with diols and polyols of various types, the reaction rate may be enhanced by the use of catalysts. Common isocyanate catalysts are suitable, and examples include dibutyltin-dilaurate, dibutyltinoxide, and the like.

Urethane resins should be synthesized with an Acid No. between 10 and 200. Urethane resins for powder coatings should be synthesized with a tack temperature of about 120° F. to 250° F. to permit handling as a powder coating. Viscosity of the film remains low to allow good flow and leveling, and then the evolution of the volatile anion of the metal salt allows ionic crosslinking to occur. For solvent or high solids coatings, urethanes can be produced in solvent or subsequently dissolved in solvent.

In accordance with this invention, the useful level of neutralization of the carboxylic acid functional copolymer, based on the equivalent of zinc carbonate added per equivalent of available carboxylic acid functionality in the copolymer, is above 10% and preferably between 30% and 200% and most preferably between 50% and 150% neutralization of the available carboxyl groups. Zinc carbonate includes other inorganic anions of zinc which produce zinc carbonate in-situ in combination with the carboxylic acid functional polymer. On a weight basis, between about 2% and 30% by weight zinc carbonate can be added to carboxyl polymer.

In accordance with this invention, the ionomeric binder is useful in powder and non-aqueous, solvent-borne coatings to provide thermoset-like properties to a heat cured paint film. By properly balancing the hydrophobicity and polarity of the ionomeric polymers of this invention, thermoset crosslinked type properties or ionomeric linking can be achieved upon heating to induce the desired ionomeric clustering in accordance with this invention. Suitable processing temperatures for the ionomer must minimize the amount of ionomeric interactions or clustering during the melt-mixing step of the powder paint which, ordinarily, dictates mixing at temperatures slightly above the tack temperature of the carboxylic acid polymer but less than the volatilization temperature of counterion of zinc carbonate. Thus, thermal curing of the powder paint can be readily achieved during the curing cycle without premature gellation of the powder coating. The resulting paint film integrity properties resemble crosslinked polymer networks and exhibit high film hardness as well as considerable resistance to solvent and water.

Cured paint films produced in accordance with this invention provide ionomeric interactions or clustering between ionomer polymer chains in a crosslink type fashion to produced cured paint films exhibiting considerable MEK resistance, water resistance, improved hardness, and other film integrity properties.

The merits of this invention are further illustrated in the following examples.

EXAMPLE 1 a) Preparation and Evaluation of Acrylic Ionomer

| | |
|---|---|
| 300 g | methylamylketone, (MAK) |
| 28 g | t-butylperbenzoate, (t-BP) |
| 70 g | methacrylic acid, (MAA) |
| 210 g | stearyl methacrylate, (SMA) |
| 280 g | styrene, (ST) |
| 140 g | butylacrylate, (BA) |

Place MAK in a 2 liter flask with stirrer, thermometer, nitrogen blanket, and condenser. Bring MAK to reflux (~150° C.). Pump in monomer-initiator mix over a 3 hour period. Hold 30 minutes, add 1.0 g t-BP, hold 30 minutes, cool.

b) Preparation of Powder Paint Ionomer Samples

Stoichiometric quantities of copolymer, zinc carbonate, and other additives were weighed out and placed into a stainless steel Vita-Mix Model 3600 blender. The sample chunks were broken by pulsing the Vita-Mix until the larger pieces were crushed. The samples were pulverized by grinding at high speed for 15 seconds in the forward mode and 15 seconds in the reverse mode. The powdered material was placed in polyethylene bags.

The powdered pre-mixed samples were melt-mixed using a Brabender two roll, water cooled mill. The mill was set to the appropriate melting temperatures of the materials to be mixed and turned on in the forward mode. The powder samples were sprinkled slowly over the hot roll and allowed to melt and mix by adjusting the spacing at the nip. When the entire sample was on the mill, the speed was adjusted to the highest setting. The sample was mixed for three minutes, with scraping and remixing every one minute. The molten sheet of resin was scraped from the mill and cooled to room temperature. The melt-mixed samples were broken into flakes by using a rubber mallet or the Vita-Mix blender. These flakes were fed into a Brinkman or Tecator grinder using a vibratory bed and a 0.5 micron screen at low speed. When the entire sample was ground, it was removed from the grinder and was seived through a 120 mesh brass or stainless steel screen using a sieve shaker.

c) Preparation of test samples

| | Neutralized | Unneutralized |
|---|---|---|
| Above acrylic | 14.29 g | 15.0 g |
| ZnCO$_3$ | 0.73 g | — |
| Methylamylketone | 0.31 g | — |

Samples were evaluated by electrostatically spraying on cold rolled steel (Parker Bonderite 1000), at 2 mils film thickness. Cure cycle was 20 minutes @ 400° F.

Evaluation of coated films

MEK Resistance evaluted by double rubs until failure by breakthrough of the film to the substrate.

| | |
|---|---|
| Unneutralized | 4.5 |
| Neutralized | 46.5 |

EXAMPLE 2 a) Polyester ionomer (A) was prepared as follows:
1612 g dodecanedioic acid (DDA)
725 g 1,6-hexane diol (HDO)
0.5 g butyl stannoic acid (BSA)

Heat with good stirring in a 5 liter flask equipped with a nitrogen blanket and a glass bead packed column with a condenser and a trap to ~170° C. Slowly warn to 220° C. (~1 hour) while collecting water. Hold at 220° C. for 3 hours. Cool. Total water of esterification ~210 ml. Acid number 48 mg KOH/g resin.

b) Polyester Ionomer (B) was prepared in the same manner as polyester (A) from the following raw materials:
1380 g dodecanedioic acid (DDA)

0.5 g butyl stannoic acid (BSA)
532 g 1,6-hexane diol (HDO)
c) Coatings were prepared as follows:

|  | Neut. | Unneut. |
|---|---|---|
| Polyester A | 20 g | 20 g |
| ZnCO$_3$ | 2.09 g | — |
| Isopropanol | 51.54 g | 46.67 g |
| Polyester B | 20 g | 20 g |
| ZnCO$_3$ | 1.07 g | — |
| Isopropanol | 49.16 g | 46.67 g |

Samples were solubilized by mixing on a horizontal shaker 24 hours. Drawdowns were prepared using a 0.003" Bird blade over cold rolled steel (Parker Bonderite 1000) and baked for 20 minutes at 400° F.

|  | MEK Resistance (Double Rubs) | |
|---|---|---|
|  | Neut. | Unneut. |
| Polyester (A) | >100 | 3.5 |
| Polyester (B) | >100 | 3.5 |

EXAMPLES 3-6 a) Prepare polyester ionomers from the following

|  | Ex. 3 | Ex. 4 | Ex. 5 | Ex. 6 |
|---|---|---|---|---|
| Dimer fatty acid (Empol 1018*) | 282 g | | | |
| Isophthalic acid (IPA) | 41.5 | | | |
| Hydrogenated bisphenol A | 120 | 100 g | 323 g | |
| Butyl stannoic acid | 0.1 | 0.2 | 0.2 | 0.2 |
| Dimer fatty acid (Empol 1010)* | | 598 | | |
| Trimethylol propane (TMP) | | 28 | | |
| Azelaic acid (AZA) | | | 404 | 538 |
| Neopentyl glycol (NPG) | | | | 216 |
| Xylene | 182 | | | |
| MEK | | 300 | 300 | 300 |
| Theo. H2O | 18 | 26 | 63 | 89 |
| Acid number | 14.2 | 37.8 | 49.8 | 41.6 |

*Empol 1018 and 1010 are dimer fatty acids made by Emery Ind.

Each of the above polymers were prepared in 1 liter flasks equipped with nitrogen blanket, paddle stirring, thermometer, condenser, water trap (and a glass bead packed column for Ex. 6 only). Heat to 170° C. over 1 hour, and then to 220° C. over 1 hour. Hold 3 hours. Total water collected should be about 95% of the theroetical values. Cool, add xylene or MEK solvents, as specified in the Table above.

b) Testing of ionomers

Polymers in Examples 3-6 inclusive were compounded with variable amounts of zinc carbonate (25% solution in MeOH/H2) indicated in the following table and tested as cured coating films applied with a 3 mil Bird Blade to a Parker Bonderite 1000 panel and cured for 20 minutes at 400° F.

|  | Neutralization | | |
|---|---|---|---|
|  | 0% | 50% | 100% |
| Ex. 3 Composition | 50 gm | 50 gm | 50 gm |
| 25% ZnCO$_3$ solution | 0 | 1.04 | 2.08 |
| MEK double rubs | 14.5 | 27 | 29 |
| Ex. 4 Composition | 50 gm | 50 gm | 50 gm |
| 25% ZnCO$_3$ solution | 0 | 2.74 | 5.48 |
| MEK double rubs | 5.5 | 7.0 | 29.5 |
| Ex. 5 Composition | 50 gm | 50 gm | 50 gm |
| 25% ZnCO$_3$ solution | 0 | 3.78 | 7.57 |
| MEK double rubs | 6.5 | 7.5 | 26.5 |
| Ex. 6 Composition | 50 gm | 50 gm | 50 gm |
| 25% ZnCO$_3$ solution | 0 | 3.16 | 6.32 |
| MEK double rubs | 3.5 | 4.0 | 13 |

EXAMPLE 7

Polyurethane Ionomer was prepared as follows:

| a) | 80.4 g | dimethylolpropionic acid, DMPA |
|---|---|---|
|  | 311 g | isophoronediisocyanate, IPDI |
|  | 0.10 g | dibutyltindilaurate, DBTDL |
|  | 500 g | toluene |
| b) | 128 g | SR-100 diol (Sartomer) |
|  | 100 g | poly(THF) 250, polytetrahydrofuran (BASF) |

Heat (a) to reflux under nitrogen with good stirring, and cook until all the DMPA is gone (2-3 hours). Add (b) and hold at reflux for 2 hours. Strip off solvent at 140° C. Tack temeprature=195° F., acid number 50.0 mg KOH/g resin.

| Coating Formulation | | |
|---|---|---|
|  | Unneut. | Neut. |
| Polyurethane (above) | 68.11 | 68.11 |
| TiO$_2$ | 40.9 | 40.9 |
| Resiflow PL200* | 0.7 | 0.7 |
| Benzoin | 0.3 | 0.3 |
| ZnCO$_3$ | — | 3.7 |

*Estron Corp.

The above ingredients were processed in Brabender 2 roll mill at 120 ° C., ground in Tecator grinder and sieved through 140 mesh stainless steel screen.

The resulting powder was electrostatically sprayed onto Bronderite 1000 (Parker) cold rolled steel and baked for 20 minutes @ 400° F.

| Cure coating film properties were as follows: | | |
|---|---|---|
|  | Unneut. | Neut. |
| Film Build (mils) | 2.01 | 2.03 |
| 60° Gloss (%) | 88.6 | 89.4 |
| Knoop Hardness Number | 20.5 | 22.1 |
| Impact (in lbs.) | | |
| Direct | <5 | 5 |
| Reverse | <5 | 5 |
| Conical Mandrel (crack length) | 4 inches | ⅛ inch |
| MEK Resistance (double rubs until breakthrough to substrate) | 62 | >300 |

EXAMPLE 8 a) A polyurethane ionomer was prepared from the following:

|  | 690.9 g | dodecanedioic acid, DDA |
|---|---|---|
|  | 472.8 g | 1,6-hexanediol, HDO |
|  | 0.5 g | butylstanoic acid, BSA |
| b) | 516 g | polyester product from (a) |
|  | 0.2 g | dibutyltindilaurate, DBTDL |

| | |
|---|---|
| 134 g | dimethylolpropionic acid, DMPA |
| 222 g | isophoronediisocyanate, IPDI |
| 500 g | methylethylketone, MEK |

Heat mix (a) to 170° C. under nitrogen with good stirring in a 2 liter flask equipped with a glass bead packed column, condenser, and trap. Raise to 220° C. over 1 hour, hold for 3 hours at 220° C. Total water from esterification should be 100 g. Cool. Prepare mix (b) in MEK, heat to reflux and hold for 2 hours. Pour product into a dish, dry in a vented oven at 125° C., and then in a vacuum oven at 60° C. The polyurethane polymer was compounded into a coating formulation as follows:

| | Unneut. | Neut. |
|---|---|---|
| Polyurethane | 68.11 | 68.11 |
| TiO$_2$ | 41.5 | 44.4 |
| Resiflow PL200* | 0.7 | 0.7 |
| Benzoin | 0.3 | 0.3 |
| ZnCO$_3$ | 0.0 | 4.91 |

*Estron Corp.

The above components were processed in Brabender 2 roll mill at 120° C., ground in Tecator grinder and sieved through 140 mesh stainless steel screen.

The resulting powder was electrostatically sprayed onto Bonderite 1000 (Parker) cold rolled steel and baked for 20 minutes @ 40° F.

The cured coating properties were as follows:

| | Unneut. | Neut. |
|---|---|---|
| Film build (mils) | 2.17 | 2.07 |
| Knoop Hardness No. | 2.89 | 4.53 |
| MEK Resistance | 27.7 | 52.0 |

EXAMPLE 9

A polyurethane ionomer was prepared as follows.

| | |
|---|---|
| 250 g | poly(THF) 1000, polytetrahydrofuran (BASF) |
| 84 g | dimethylolpropionic acid, DMPA |
| 167 g | isophoronediisocyanate, IPDI |
| 250 g | MEK |
| 0.50 g | dibutyltindilaurate, DBTDL |

Heat slowly to reflux (88° C.), and stir for 2 hours after DMPA is gone (~2 hours). Cool and use as a solution polymer. Coating compositions were prepared as follows:

| | Unneut. | 50% | 100% |
|---|---|---|---|
| Polyurethane above | 50 g | 50 g | 50 g |
| ZnCO$_3$ | 0.0 | 2.62 g | 5.22 g |
| MEK | 12.5 g | 32.39 g | 31.42 g |

The coatings were applied to cold rolled steel (Parker Bonderite 1000) with a 0.003" Bird Blade, and cured for 20 minutes @ 400° F.

| | Coating Results | | |
|---|---|---|---|
| % Neut. | 0 | 50% | 100% |
| Film build (mils) | 2.1 | 2.2 | 2.0 |
| DI Resistance (double rubs to breakthrough) | >200 | >200 | >200 |
| MEK Resistance (double rubs to breakthrough) | 77.5 | 115 | 159 |
| Impact (inch-lbs.) | | | |
| Direct | 60 | >160 | >160 |
| Reverse | 20 | 130 | >160 |

I claim:
1. In a process for producing a non-aqueous heat cured protective coating composition containing a reactive poymeric binder and applying the protective coating composition to a substrate, the process steps comprising:
producing a reactive polymeric binder comprising a carboxyl functional polymer having an Acid No. between 10 and 200 and number average molecular weight between about 500 and 100,000 where the carboxyl functional polymer is selected from an acrylic polymer, a linear polyester polymer, a polyester-acrylic graft copolymer, and a polyurethane polymer;
intermixing said carboxyl polymer with zinc carbonate in sufficient amounts to neutralize at least 10% of the equivalents of carboxyl functionality of the carboxyl polymer to form at least a partially zinc neutralized ionomer substantially free of ionic clustering between said zinc carbonate and said carboxyl functional polymer to provide a coating composition;
applying the coating composition as a surface coating film to the surface of a substrate;
heating the applied coating film to a heat curing temperature above about 120° C. to coreact the zinc carbonate with the carboxyl functional polymer, and the zinc cation clusters with the carboxyl functional polymer to form ionomeric links and a hardened applied coating film.
2. The process of claim 1 where the applied coating is heat cured at temperatures between about 150° C. and 200° C.

* * * * *